US010008902B2

(12) United States Patent
Urabe et al.

(10) Patent No.: US 10,008,902 B2
(45) Date of Patent: Jun. 26, 2018

(54) STATOR FOR ELECTRIC MOTOR, ELECTRIC MOTOR, AND AIR CONDITIONER

(71) Applicant: Mitsubishi Electric Corporation, Tokyo (JP)

(72) Inventors: Yuto Urabe, Tokyo (JP); Hiroki Aso, Tokyo (JP); Kazunori Sakanobe, Tokyo (JP); Mineo Yamamoto, Tokyo (JP); Hiroyuki Ishii, Tokyo (JP); Junichiro Oya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 15 days.

(21) Appl. No.: 15/301,171

(22) PCT Filed: Jul. 7, 2015

(86) PCT No.: PCT/JP2015/069489
§ 371 (c)(1),
(2) Date: Sep. 30, 2016

(87) PCT Pub. No.: WO2016/006594
PCT Pub. Date: Jan. 14, 2016

(65) Prior Publication Data
US 2017/0025919 A1    Jan. 26, 2017

(30) Foreign Application Priority Data

Jul. 10, 2014  (WO) .................. PCT/JP2014/068426

(51) Int. Cl.
*H02K 5/02* (2006.01)
*H02K 5/22* (2006.01)
(Continued)

(52) U.S. Cl.
CPC ............... *H02K 5/225* (2013.01); *F24F 1/38* (2013.01); *F24F 7/007* (2013.01); *H02K 3/522* (2013.01);
(Continued)

(58) Field of Classification Search
CPC .......... H02K 29/08; H02K 3/522; H02K 5/02; H02K 5/225; H02K 11/21; F24F 1/38; F24F 7/007
(Continued)

(56) References Cited

U.S. PATENT DOCUMENTS 5,540,598 A     7/1996  Davis
2011/0193452 A1  8/2011  Yakushiji
(Continued)

FOREIGN PATENT DOCUMENTS

JP    08-008002 A    1/1996
JP    3054957 U    10/1998
(Continued)

OTHER PUBLICATIONS

International Search Report of the International Searching Authority dated Sep. 29, 2015 in the corresponding international application No. PCT/JP2015/069489 ( and English translation).

*Primary Examiner* — Naishadh Desai
(74) *Attorney, Agent, or Firm* — Posz Law Group, PLC

(57) ABSTRACT

The present invention includes a stator; a substrate on which a position detection circuit for a rotor is mounted; a lead wiring part attached to one axial end of the stator and routing a sensor lead to the position detection circuit; and a housing connected to an end of the sensor lead. The substrate is attached to a first surface side of the lead wiring part, and the housing is disposed at a position that is opposed to a position at which the substrate is attached and that is on a second surface side of the lead wiring part, and the lead wiring part
(Continued)

includes a housing contact portion provided between the position at which the substrate is attached and the position at which the housing is disposed.

7 Claims, 16 Drawing Sheets

(51) Int. Cl.
| | | |
|---|---|---|
| *H02K 11/21* | (2016.01) | |
| *F24F 7/007* | (2006.01) | |
| *H02K 29/08* | (2006.01) | |
| *H02K 3/52* | (2006.01) | |
| *F24F 1/38* | (2011.01) | |
| *H02K 5/10* | (2006.01) | |
| *H02K 11/215* | (2016.01) | |

(52) U.S. Cl.
CPC ............. *H02K 5/02* (2013.01); *H02K 11/21* (2016.01); *H02K 29/08* (2013.01); *H02K 5/10* (2013.01); *H02K 11/215* (2016.01)

(58) Field of Classification Search
USPC .......................................................... 310/71
See application file for complete search history.

(56) References Cited

U.S. PATENT DOCUMENTS

| | | | |
|---|---|---|---|
| 2015/0159656 A1* | 6/2015 | Urabe | .................. F04D 13/064 |
| | | | 165/104.31 |
| 2015/0263581 A1* | 9/2015 | Yamamoto | ............. H02K 29/08 |
| | | | 310/43 |
| 2016/0036279 A1* | 2/2016 | Aso | ........................ H02K 3/522 |
| | | | 310/43 |

FOREIGN PATENT DOCUMENTS

| | | |
|---|---|---|
| JP | 2010-273517 A | 12/2010 |
| JP | 2010-273525 A | 12/2010 |
| JP | 2011-163232 A | 8/2011 |
| JP | 2013-198218 A | 9/2013 |
| WO | 2014-148537 A1 | 9/2014 |

* cited by examiner

STATOR FOR ELECTRIC MOTOR, ELECTRIC MOTOR, AND AIR CONDITIONER

FIELD

The present invention relates to a stator for an electric motor, an electric motor, and an air conditioner.

BACKGROUND

The stator described in Patent Literature 1 is one of conventional stators for electric motors. The stator described in Patent Literature 1 includes a stator assembly; a substrate on which a sensor circuit for position detection is formed; a lead wiring part; a power-lead retaining part that is attached to a lead-out portion of the lead wiring part and retains power leads; and a sensor-lead retaining part that is attached to the lead-out portion of the lead wiring part and retains sensor leads. The power leads and the sensor leads are arranged into two levels and are led out to the outside from the front and back sides of the lead-out portion, respectively. The stator described in Patent Literature 1 is easy to assemble; therefore, costs can be reduced and quality can be improved.

PATENT LITERATURE

Patent Literature 1: Japanese Patent Application Laid-open No. 2010-273525

The conventional stator described above, however, has a restriction on the axial distance between the stator that includes the substrate and the rotor that includes a position detection magnet part due to the amount contacts protrude from the substrate. The contacts bring the substrate on which the sensor circuit is formed and the sensor leads into contact with each other. In the case of a molded stator obtained by molding a resin onto a stator assembly, it is necessary to provide a mold resin depending on the amount the contacts protrude from the substrate; therefore, there is a problem in that it is difficult to reduce the thickness of the mold resin.

The present invention has been achieved in view of the above and an object of the present invention is to provide a stator for an electric motor, an electric motor, and an air conditioner that can have further improved quality.

SUMMARY

In order to solve the above problems and achieve the object, an aspect of the present invention is a stator for an electric motor including: a substrate on which a position detection circuit for a rotor is mounted; a lead wiring part attached to one axial end of the stator and routing a sensor lead to the position detection circuit; and a housing connected to an end of the sensor lead, wherein the substrate is attached to a first surface side of the lead wiring part, and the housing is disposed at a position that is opposed to a position at which the substrate is attached and that is on a second surface side of the lead wiring part, and the lead wiring part includes a housing contact portion provided between the position at which the substrate is attached and the position at which the housing is disposed.

The stator for an electric motor according to the resent invention can reduce the distance between the substrate and the rotor; therefore, an effect is obtained where the detection accuracy of the rotor position can be improved and the size of the electric motor can be reduced.

DETAILED DESCRIPTION

Exemplary embodiments of a stator for an electric motor, an electric motor, and an air conditioner according to the present invention will be explained below in detail with reference to the drawings. This invention is not limited to the embodiments.

Embodiment

Figure 1:
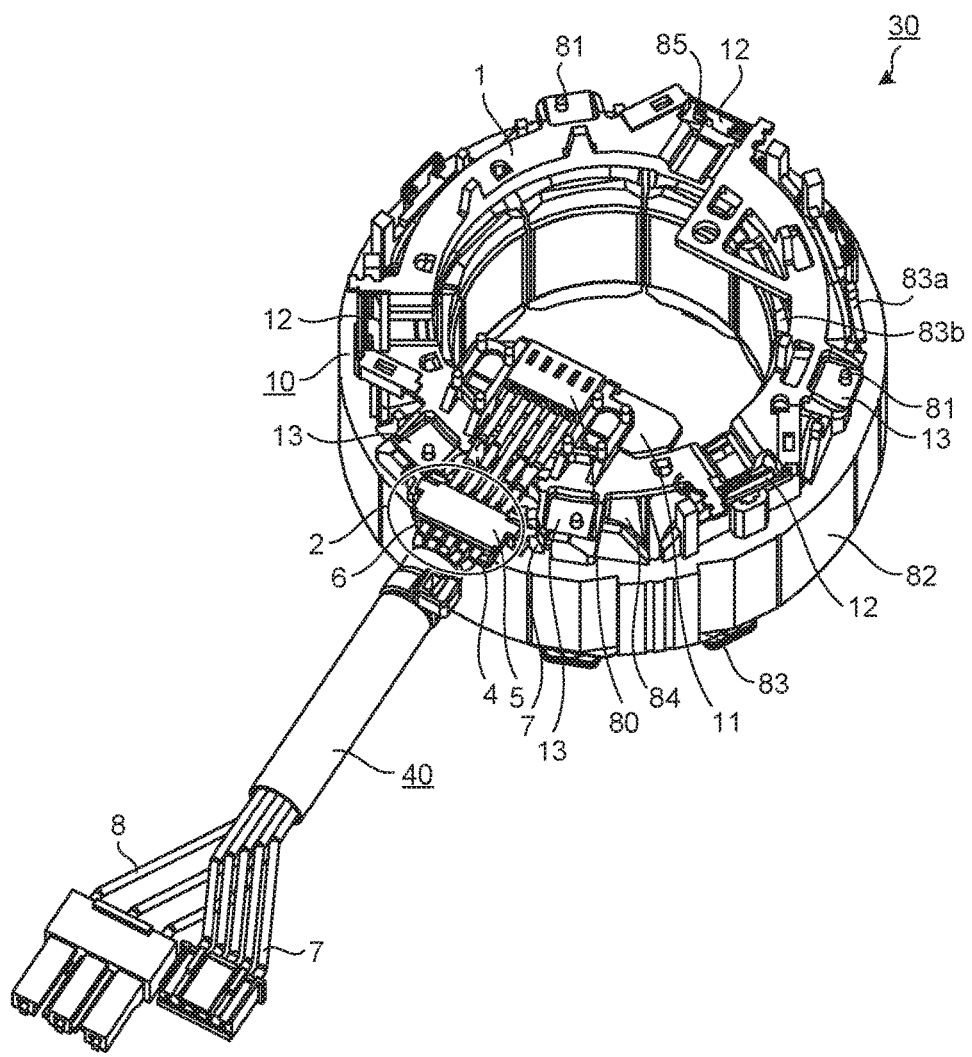
FIG. 1 is a perspective view of a stator assembly of an electric motor according to an embodiment of the present invention when viewed from the substrate side.
Figure 2:
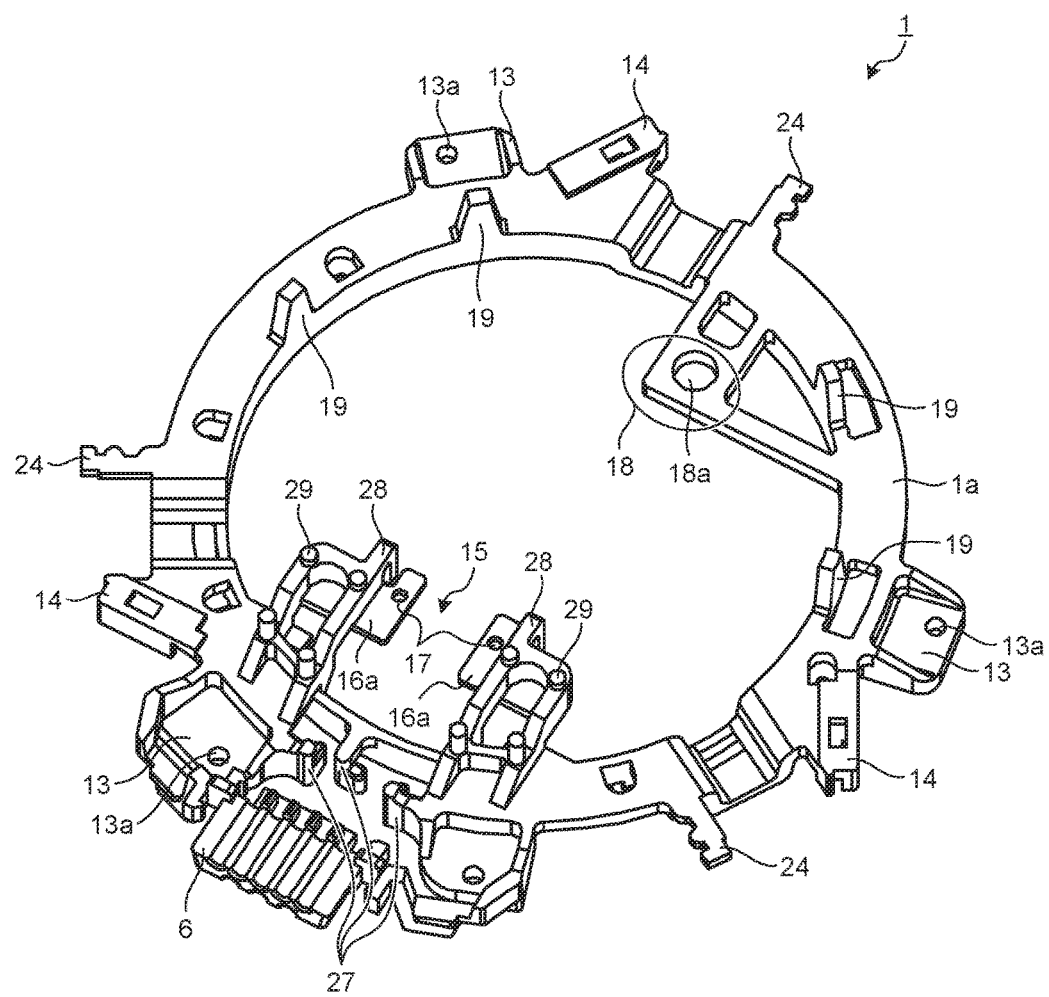
FIG. 2 is a perspective view of a lead wiring part.
Figure 3:
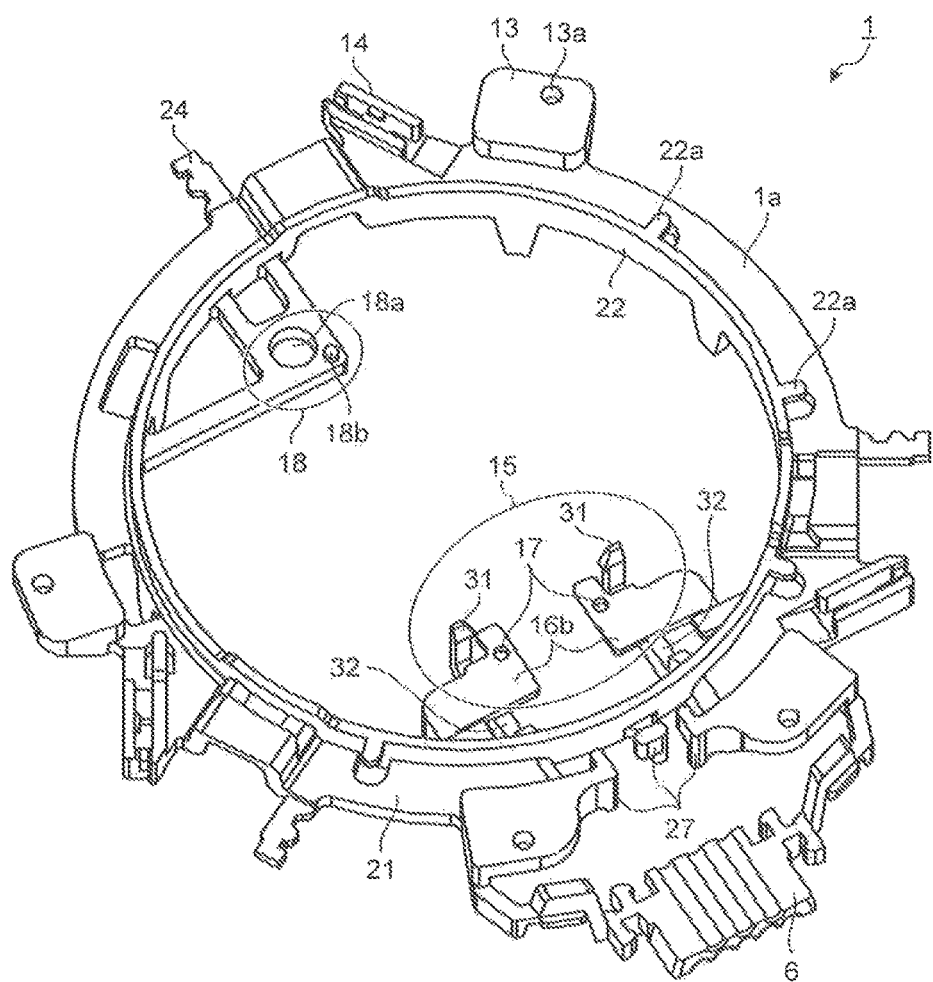
FIG. 3 is a perspective view of the lead wiring part illustrated in FIG. 2 when viewed from the opposite side.
Figure 4:
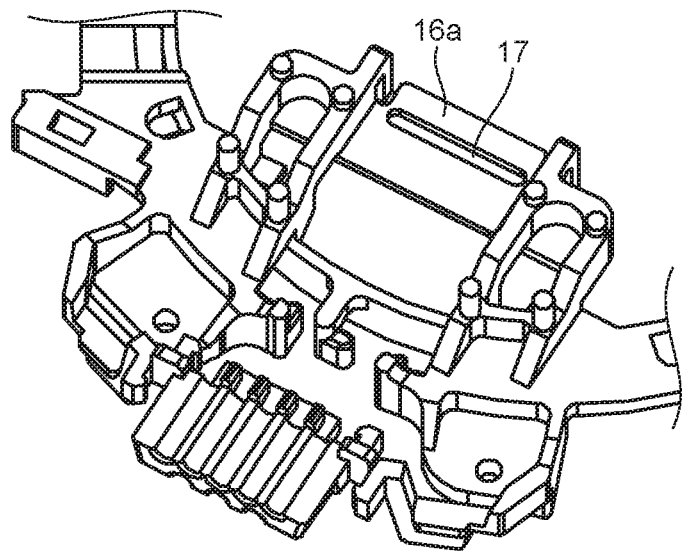
FIG. 4 is a diagram illustrating an example of a substrate retaining portion of the lead wiring part.
Figure 5:
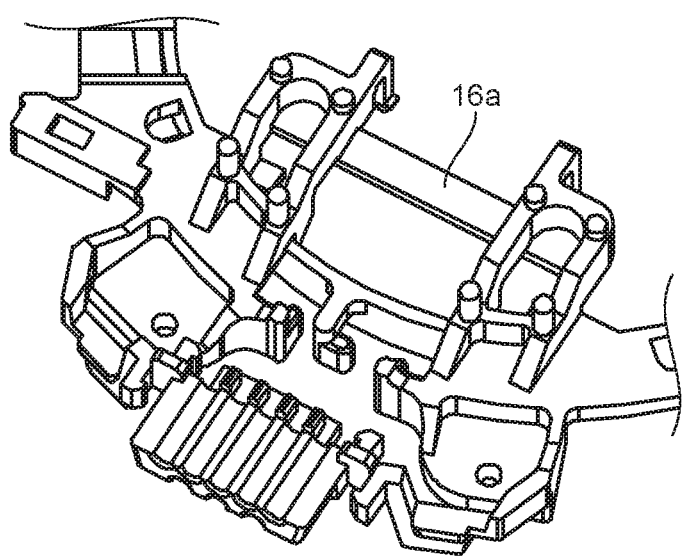
FIG. 5 is a diagram illustrating an example of the substrate retaining portion of the lead wiring part.
Figure 6:
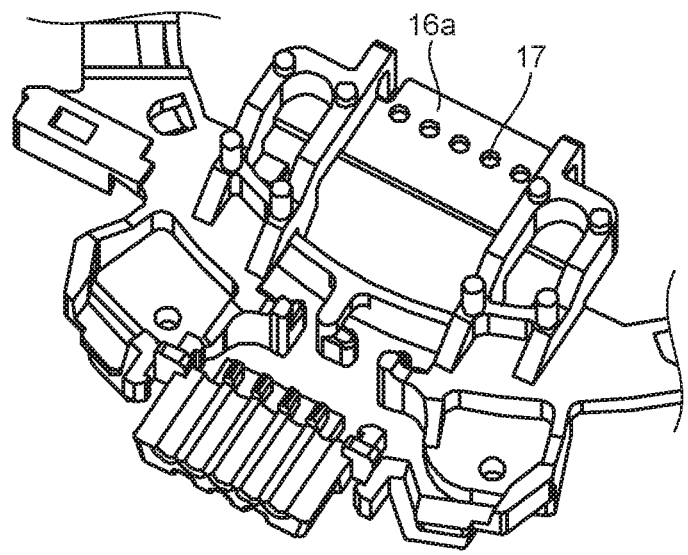
FIG. 6 is a diagram illustrating an example of the substrate retaining portion of the lead wiring part.
Figure 7:
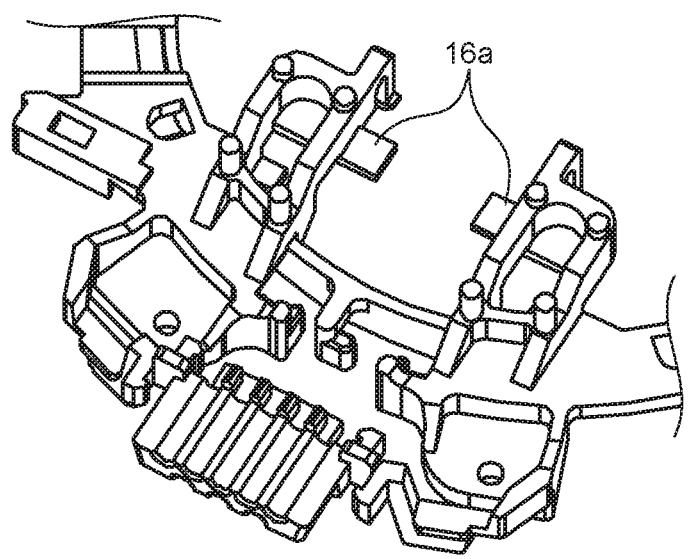
FIG. 7 is a diagram illustrating an example of the substrate retaining portion of the lead wiring part.
Figure 8:
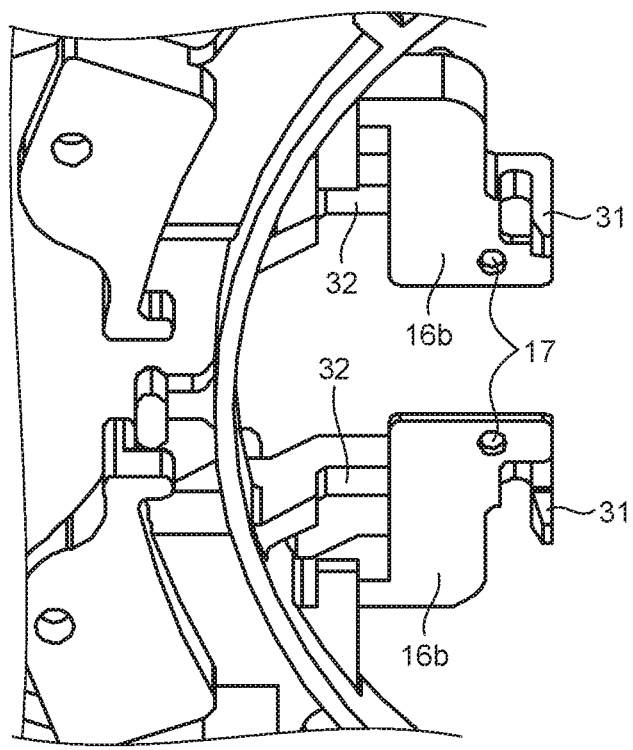
FIG. 8 is an enlarged view of the substrate retaining portion and its surroundings.
Figure 9:
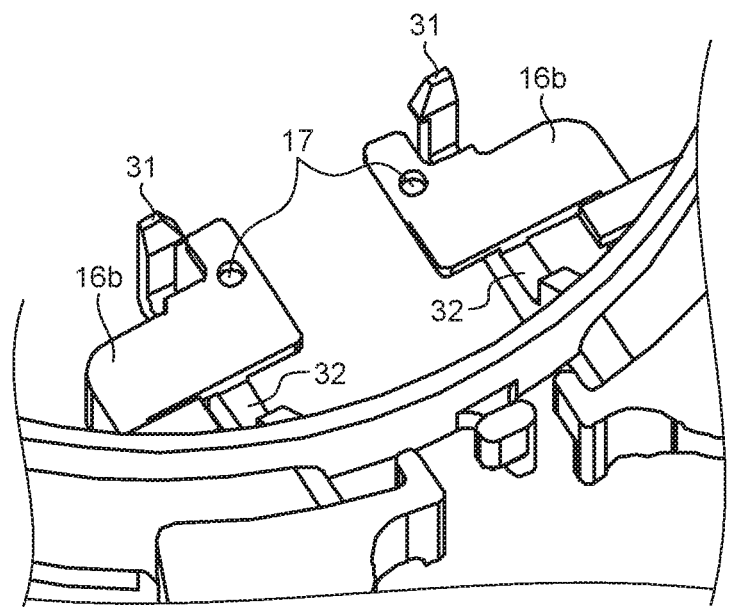
FIG. 9 is an enlarged view of the substrate retaining portion and its surroundings.
Figure 10:
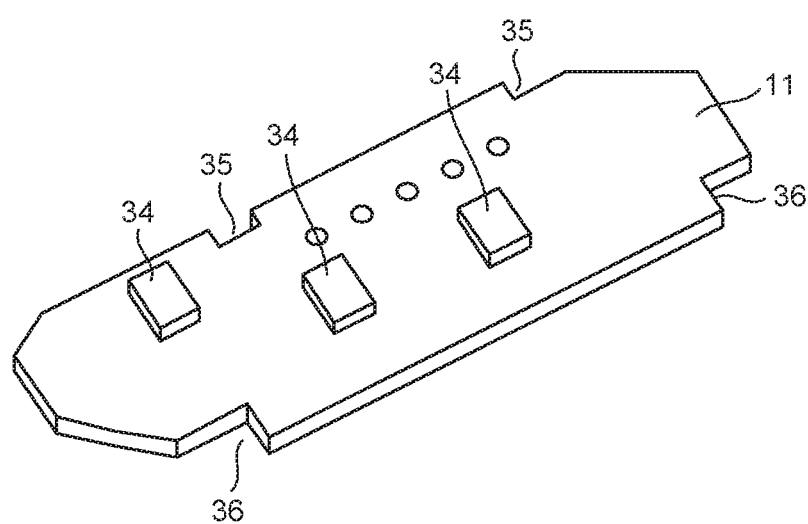
FIG. 10 is a perspective view of a sensor substrate.
Figure 11:
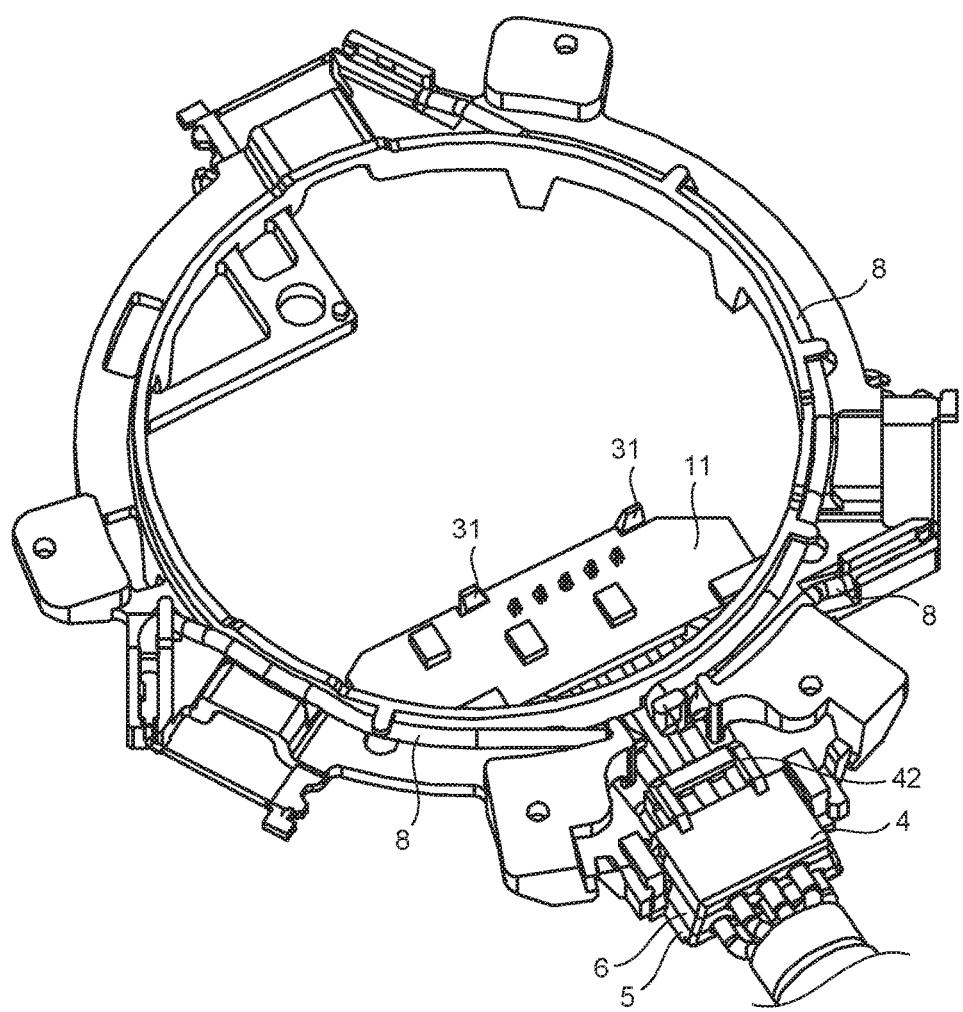
FIG. 11 is a perspective view of the lead wiring part on which power leads are routed.
Figure 12:
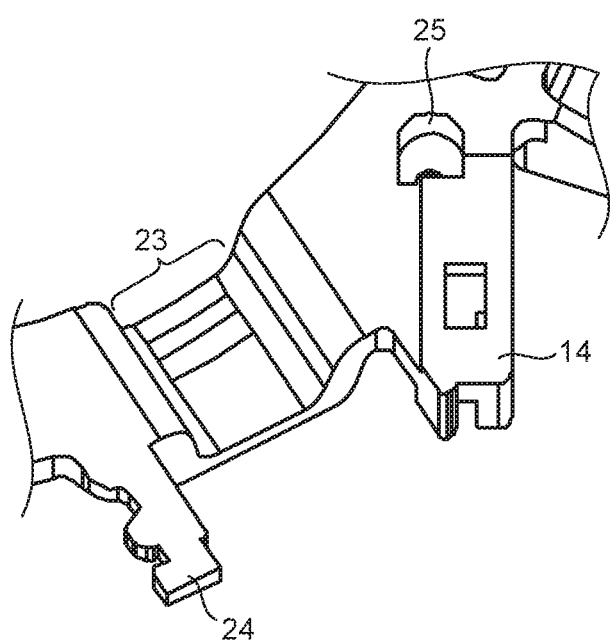
FIG. 12 is an enlarged view of a lead-end retaining portion.
Figure 13:
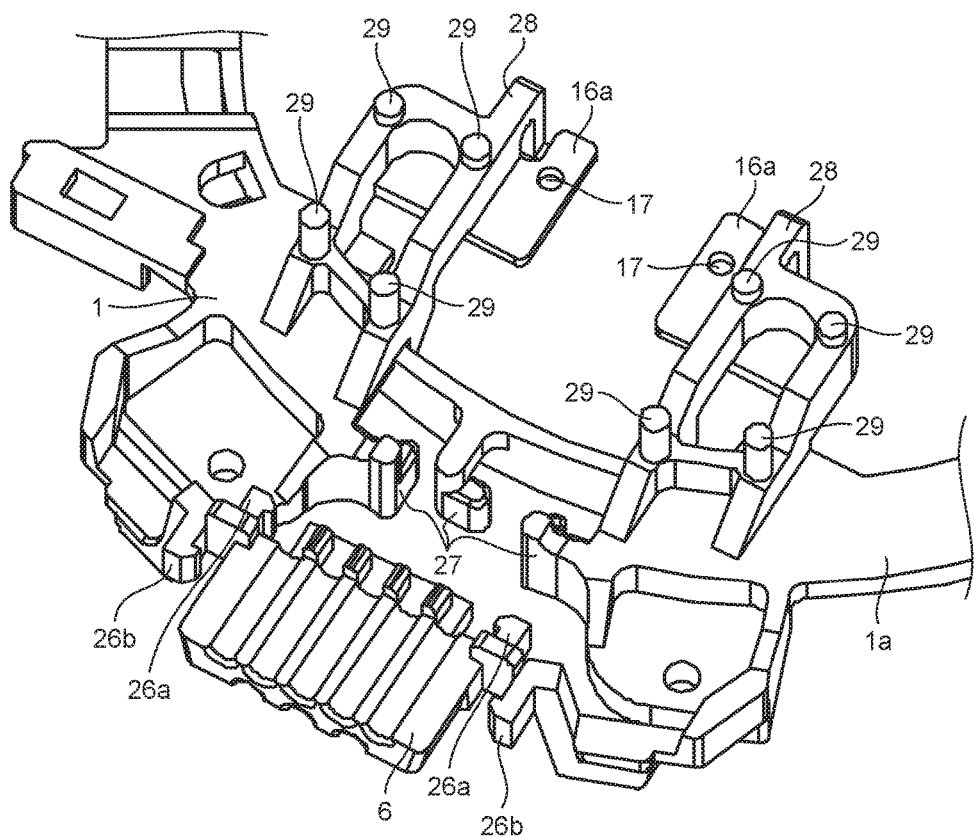
FIG. 13 is an enlarged view of a lead-out part and its surroundings.
Figure 14:
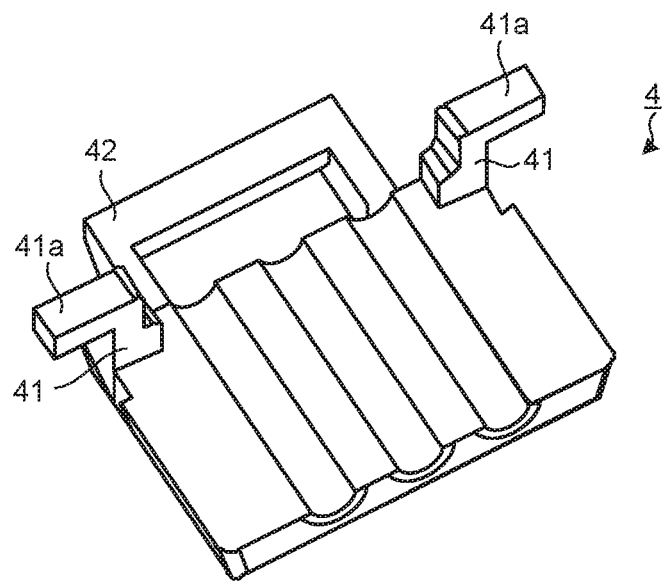
FIG. 14 is a perspective view of a power-lead retaining part.
Figure 15:
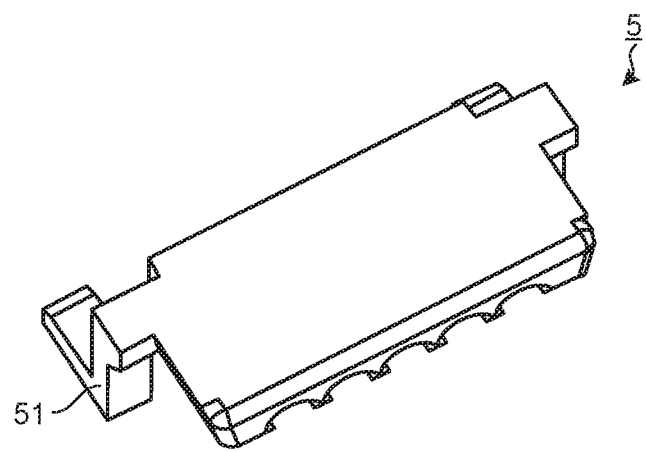
FIG. 15 is a perspective view of a sensor-lead retaining part.
Figure 16:
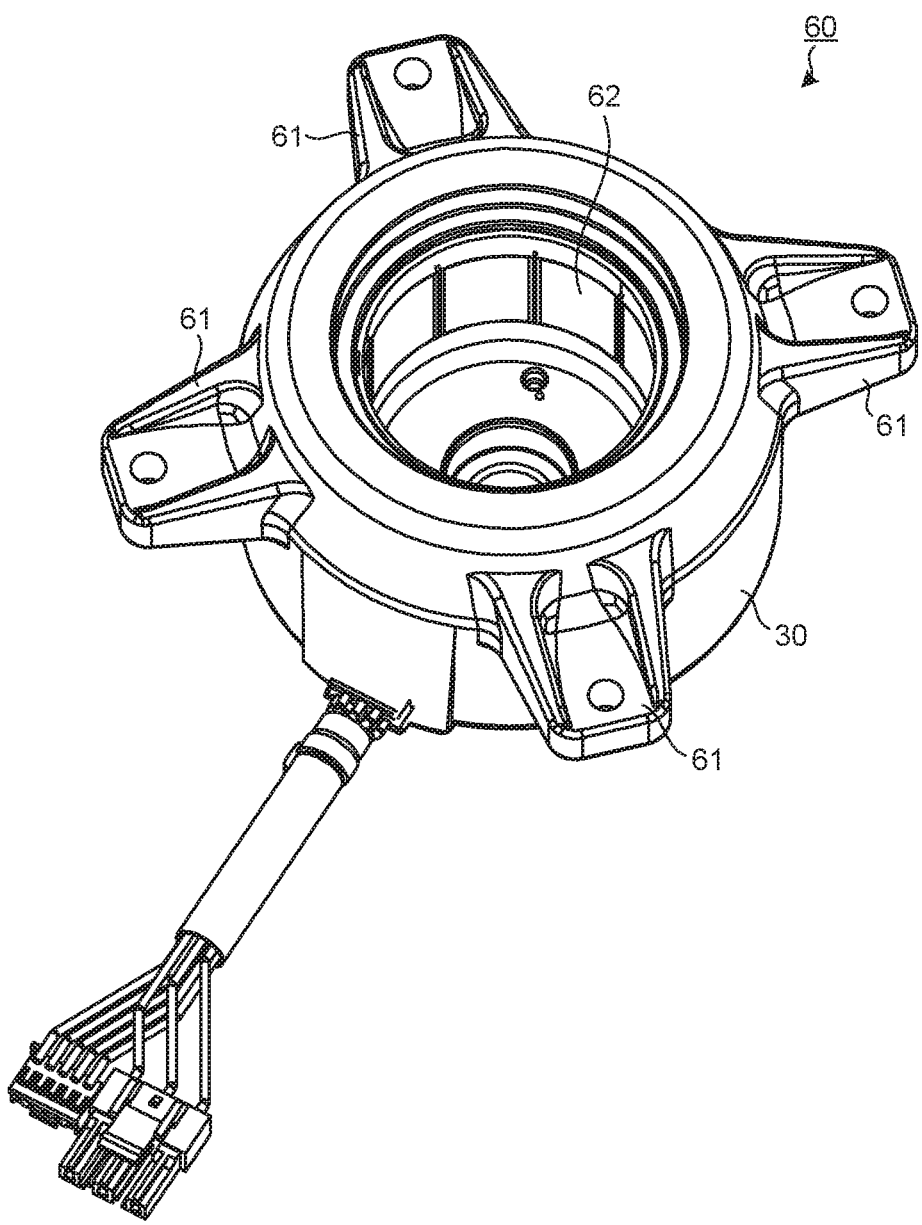
FIG. 16 is a perspective view of a molded stator.
Figure 17:
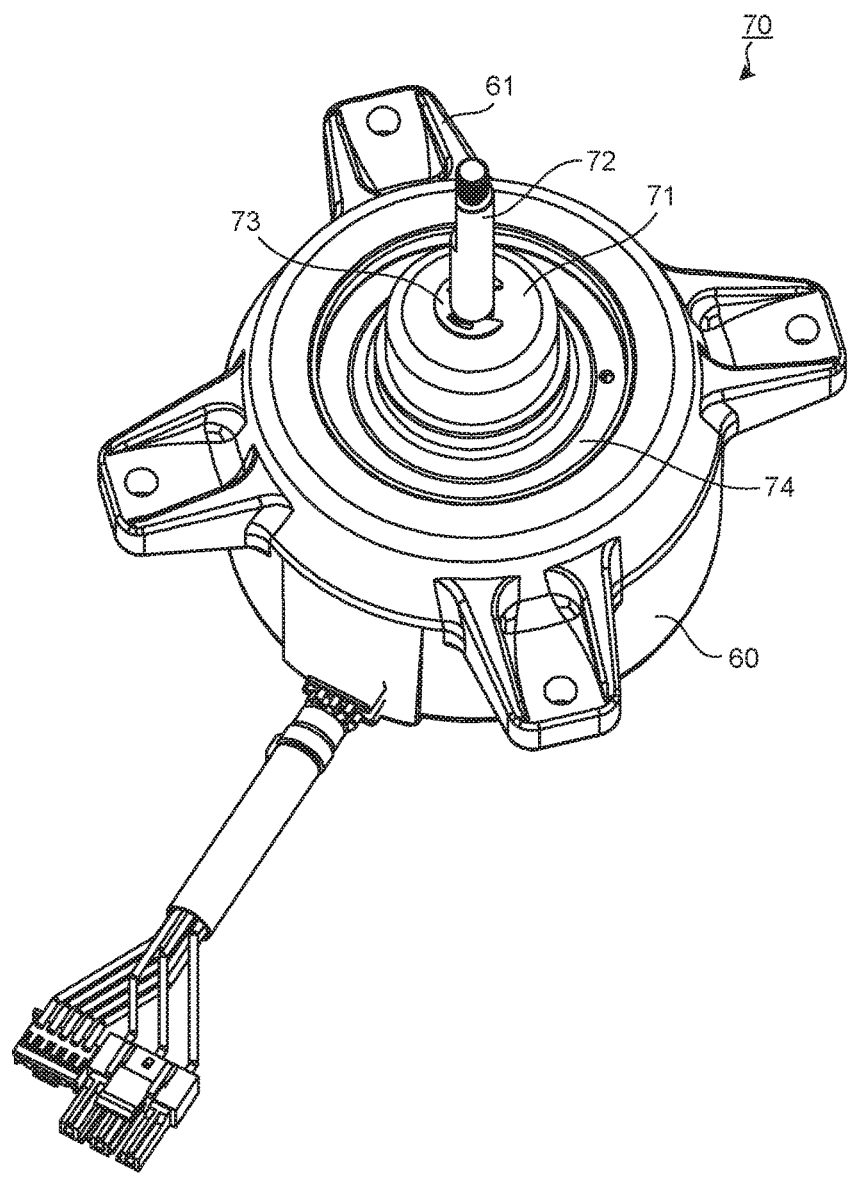
FIG. 17 is a perspective view of a molded electric motor.
Figure 18:
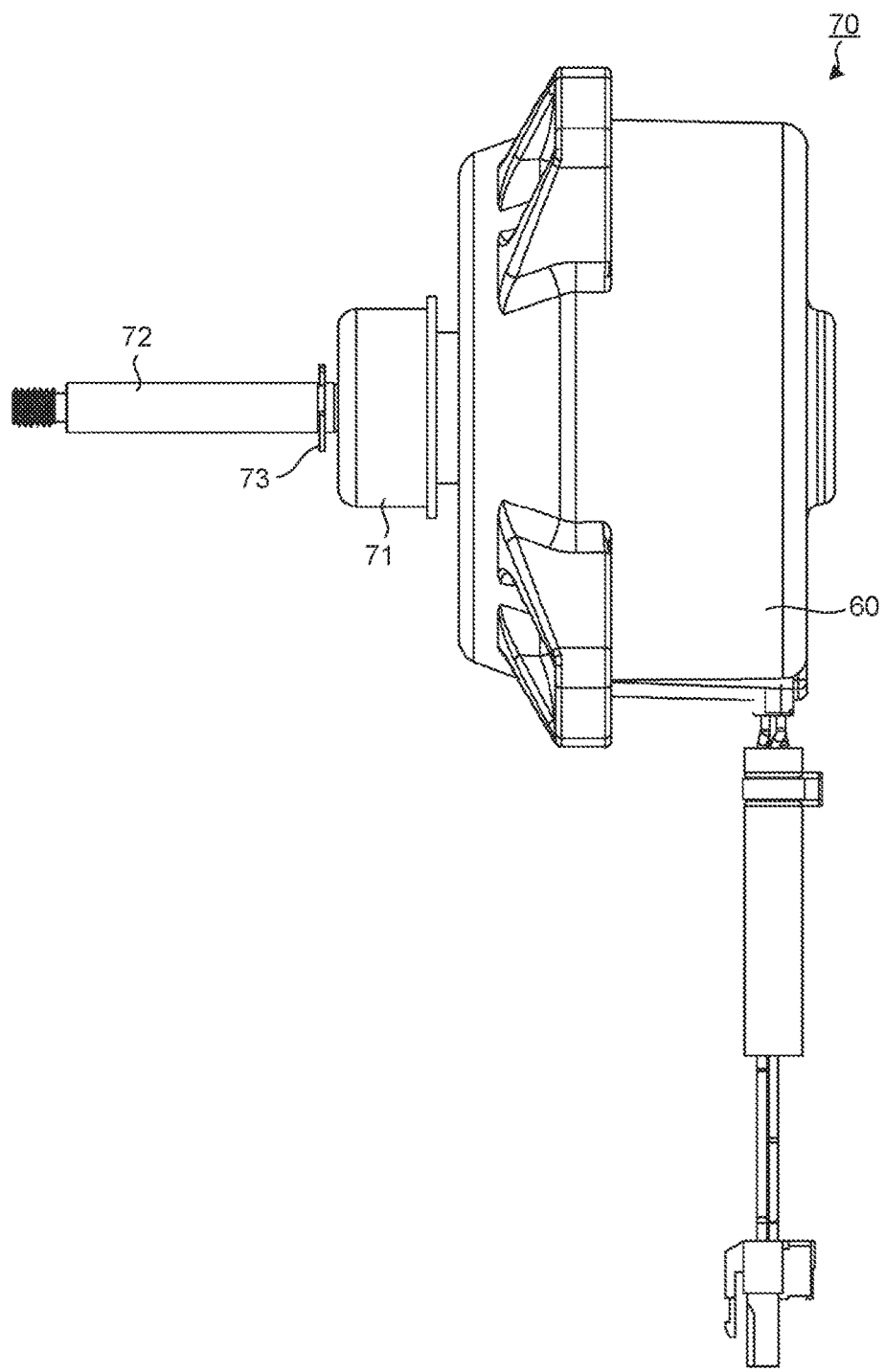
FIG. 18 is a side view of the molded electric motor.
Figure 19:
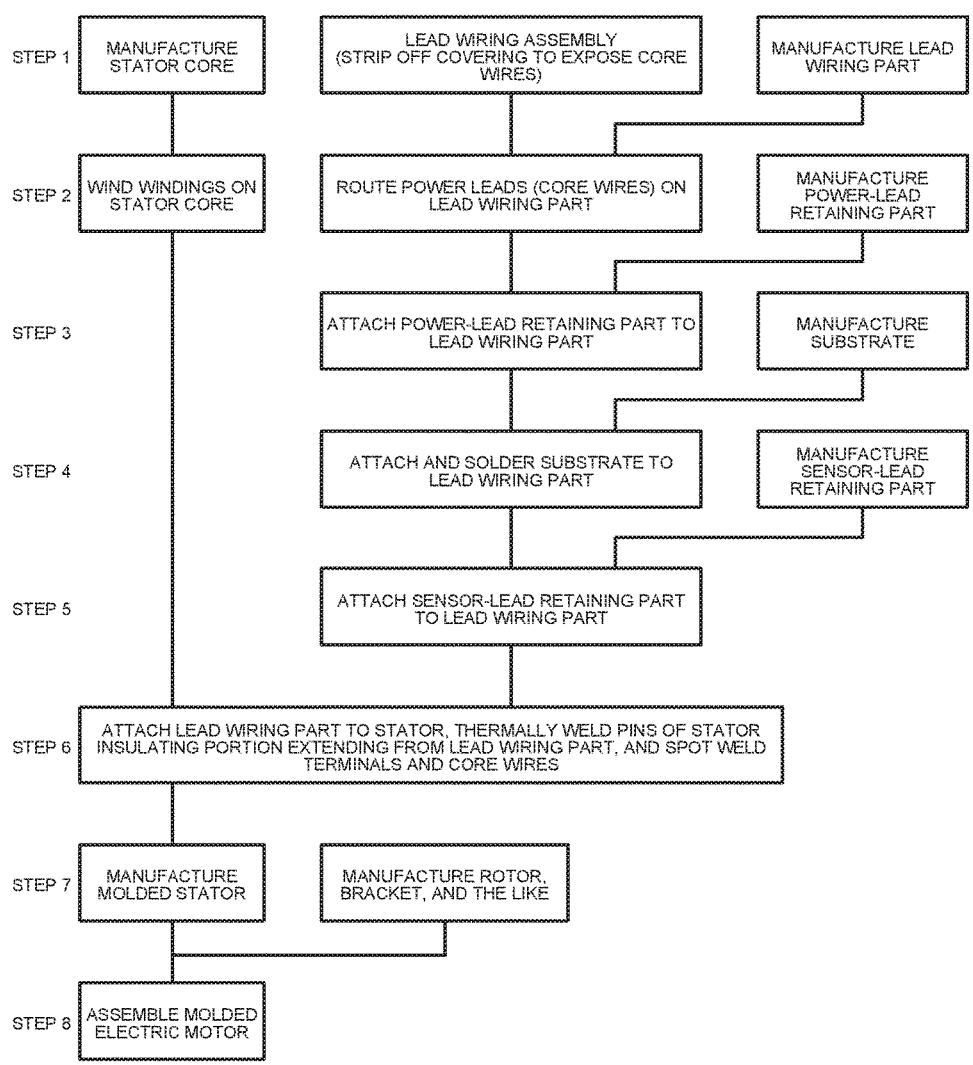
FIG. 19 is a diagram illustrating a manufacturing process of the molded electric motor.
Figure 20:
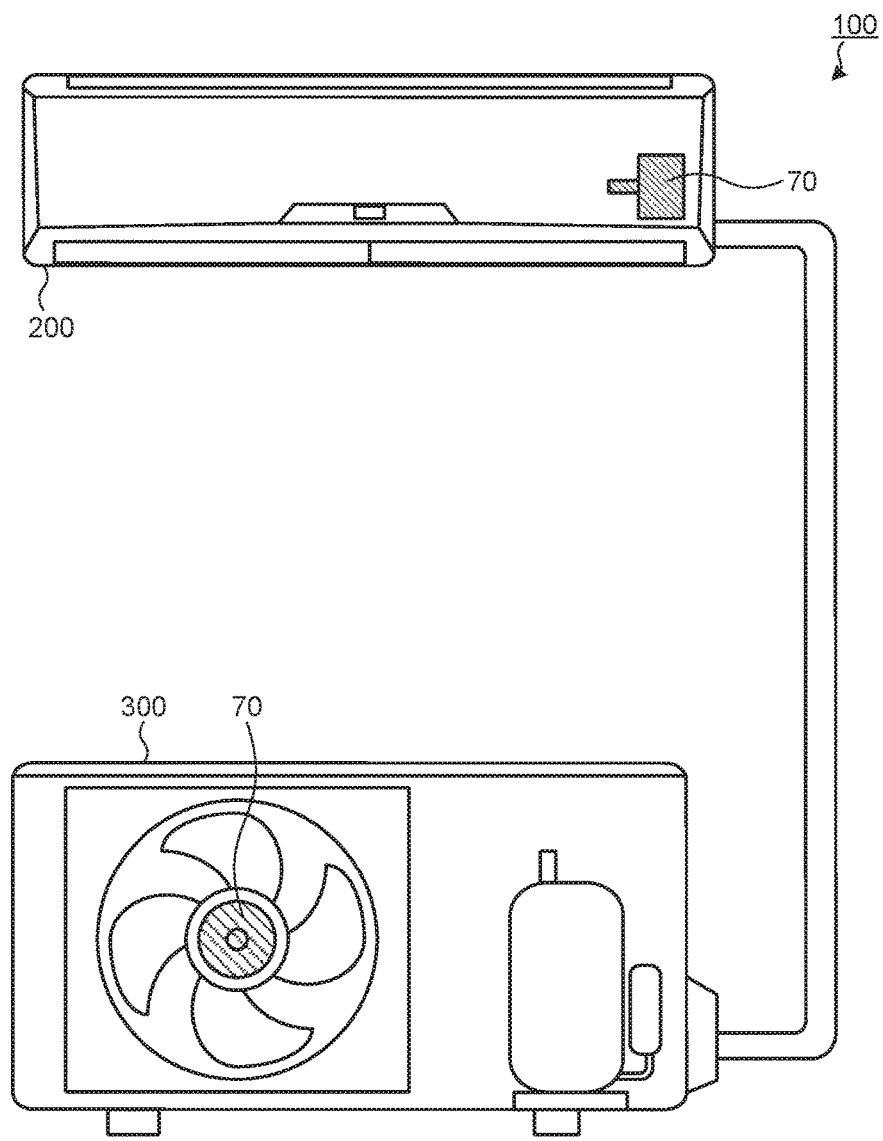
FIG. 20 is a diagram of a configuration of an air conditioner with the molded electric motor incorporated therein.

FIG. 1 is a perspective view of a stator assembly of an electric motor according to an embodiment of the present invention when viewed from the substrate side. FIG. 2 is a perspective view of a lead wiring part. FIG. 3 is a perspective view of the lead wiring part illustrated in FIG. 2 when viewed from the opposite side. FIG. 4 is a diagram illustrating an example of a substrate retaining portion of the lead wiring part. FIG. 5 is a diagram illustrating an example of the substrate retaining portion of the lead wiring part. FIG. 6 is a diagram illustrating an example of the substrate retaining portion of the lead wiring part. FIG. 7 is a diagram illustrating an example of the substrate retaining portion of the lead wiring part. FIG. 8 is an enlarged view of the substrate retaining portion and its surroundings. FIG. 9 is an enlarged view of the substrate retaining portion and its surroundings. FIG. 10 is a perspective view of a sensor substrate. FIG. 11 is a perspective view of the lead wiring part on which power leads are routed. FIG. 12 is an enlarged view of a lead-end retaining portion. FIG. 13 is an enlarged view of a lead-out part and its surroundings. FIG. 14 is a perspective view of a power-lead retaining part. FIG. 15 is a perspective view of is a sensor-lead retaining part. FIG. 16 is a perspective view of a molded stator. FIG. 17 is a perspective view of a molded electric motor. FIG. 18 is a side view of the molded electric motor. FIG. 19 is a diagram illustrating a manufacturing process of the molded electric motor. FIG. 20 is a diagram of a configuration of an air conditioner with the molded electric motor incorporated therein.

A stator assembly 30 illustrated in FIG. 1 includes an annular stator 10; a lead wiring part 1, which is attached to the stator 10 at one axial end of the stator 10; a substrate 11 attached to the lead wiring part 1; and a lead wiring assembly 40.

The stator 10 includes a stator core 82, which is formed by stacking, realized by crimping, welding, bonding, or the like, magnetic steel sheets that are stamped into strips in the axial direction of the shaft 72 (see FIG. 17) of the rotor (not illustrated); an insulating portion 83; and windings 84, which are magnetic wires wound around the insulating portion 83.

The insulating portion 83 is formed by molding a thermoplastic resin, such as PBT (Polybutylene Terephthalate), such that it is integral with the stator core 82 or is formed by attaching the molded thermoplastic resin to the stator 10. The insulating portion 83 includes a plurality of pins 81 projecting toward the lead wiring part 1 and a plurality of terminals 12 to which power is supplied from an external source.

The magnet wires are routed at one end to hook portions 85 of the terminals 12 and are bonded to the hook portions 85 by fusing, soldering, or the like. The magnet wires of all the phases are collected together at the other end to form a neutral point.

In the following description, the outer side of the end surface of the stator core 82 in the axial direction, i.e., the side on which the terminals 12 are provided, is referred to as a connection side and the side opposite to the connection side is referred to as a counter-connection side.

An insulating outer wall 83a constituting the insulating portion 83 prevents the windings 84 from falling toward the outer circumference side of the stator core 82, and a plurality of pins 81 for attaching the lead wiring part 1 to the stator 10 are provided at the axial end portion of the insulating outer wall 83a on the connection side.

An insulating inner wall 83b constituting the insulating portion 83 prevents the windings 84 from falling toward the inner circumference side of the stator core 82. Projections (not illustrated) are provided at the axial end portion of the insulating inner wall 83b on the counter-connection side. When a resin is molded onto the stator assembly 30, the projections abut against a mold core metal portion in the axial direction.

The axial end portion of the insulating outer wall 83a is formed such that it has a slightly greater height than the maximum axial height of the windings 84. Moreover, the windings 84 are formed such that their axial height is reduced toward the insulating inner wall 83b from the insulating outer well 83a. With this configuration, when the height of the projections (not illustrated) on the counter-connection side of the insulating inner wall 83b is set the same as the height of the axial end portion of the insulating outer wall 83a, a sufficient distance from the projections to the windings 84 can be provided. Thus, when the stator 10 is placed on the mold core metal portion with the counter-connection side of the stator 10 facing downward, the stator 10 can be placed stably without the windings 84 coming into contact with the mold core metal portion. This enables an improvement in productivity and quality.

The lead wiring assembly 40 includes power leads 8 for supplying power to the windings 84; sensor leads 7; and a housing 80 connected to the ends of the sensor leads 7. The housing 80 is connected to the ends of the sensor leads 7 that are located inside the mold when the a resin is molded onto the stator assembly 30.

Electronic parts, such as Hall ICs 34 serving as a position detection circuit for the rotor, are mounted on the substrate 11 (see FIG. 10). The housing 80 includes contacts for electrically connecting the position detection circuit formed on the substrate 11 to the sensor leads 7. When the substrate 11 is attached to a substrate retaining portion 15, which will be described later, and the housing 80 is disposed on the surface on the counter-stator side of the substrate 11, the contacts are exposed on one surface (a surface on the stator side) of the substrate 11. The sensor leads 7 and the position detection circuit are electrically connected by bonding the contacts exposed on one surface of the substrate 11 with solder.

The lead wiring part 1 is used for the wiring of the sensor leads 7 and the power leads 8. The relationship between the sensor leads 7, the power leads 8, and the lead wiring part 1 is maintained by a lead lead-out portion 2 (see FIG. 1), which includes a power-lead retaining part 4 (see FIG. 14), a sensor-lead retaining part 5 (see FIG. 15), and a lead-out part 6 (see FIG. 13).

Next, the lead wiring part 1 will be explained. The lead wiring part 1 is molded with a thermoplastic resin, such as PBT, such that it is formed into an approximately doughnut shape (see FIG. 2). As illustrated in FIG. 2, a plurality of attaching legs 13 for the attachment to the stator 10 are provided at the outer circumference of the lead wiring part 1. Each of the attaching legs 13 has a hole 13a for inserting the pin 81 that is used for attaching the lead wiring part 1 and is included in the insulating portion 83 of the stator 10. When the lead wiring part 1 is attached to the stator 10, the attaching legs 13 come into contact with the installation surface of the wiring part of the insulating portion 83 of the stator 10, and thus the lead wiring part 1 is positioned in the axial direction. At this point in time, because the pins 81 of the insulating portion 83 are inserted into the holes 13a of the attaching legs 13, the lead wiring part 1 is positioned in the rotational direction. After the lead wiring part 1 is positioned, i.e., after the pins 81 of the insulating portion. 83 are inserted into the holes 13a of the attaching legs 13, the pins 81 are, for example, ultrasonically welded so as to secure the lead wiring part 1 to the stator 10.

As illustrated in FIG. 2 and FIG. 3, the lead wiring part 1 includes the substrate retaining portion 15 on the inner circumference side of the stator 10. The substrate retaining portion 15 includes claws 31 and grooves 32 for attaching the substrate 11. The substrate 11 on which the position detection circuit for the rotor is mounted is attached to the substrate retaining portion 15. The substrate retaining portion 15 further includes a housing contact portion 16a with a given thickness. The housing 80 is pressed against the housing contact portion 16a. The thickness of the housing contact portion 16a is adjusted in accordance with the length of the contacts (contacts for electrically connecting the sensor leads 7 and the position detection circuit on the substrate 11) so as to adjust the amount the contacts protrude from the substrate 11, thereby enabling the amount the contacts protrude from the substrate 11 (amount of protrusion toward the rotor side) to be reduced. Reducing the amount of protrusion enables the distance between the substrate 11 and the rotor to be reduced. This can improve the detection accuracy of the rotor position and reduce the size of the electric motor. In the case of a molded stator obtained by molding a resin onto a stator assembly, the mold thickness can be designed without being dependent on the length of the contacts.

The housing contact portion 16a is configured as part of the lead wiring part 1; therefore, it is not necessary to use a separate part for ensuring the distance between the housing 80 and the substrate 11, which leads to a cost reduction.

Moreover, as illustrated in FIG. 2 and FIG. 3, the housing contact portion 16a of the substrate retaining portion 15 includes contact insertion portions 17 at positions corresponding to the contacts. Provision of the contact insertion portions 17 enables the housing contact portion 16a and the contacts to avoid interference with each other and enables the contact area of the housing 80 and the housing contact portion 16a to be increased. An increase in the contact area of the housing 80 and the housing contact portion 16a can reduce the axial displacement of the stator when the lead wiring part 1 and the substrate 11 are attached.

The contact insertion portions 17 can have any shape as long as they are provided at positions corresponding to the contacts. For example, the contact insertion portions 17 may be circular holes, of a polygonal shape, elongated holes, or rectangular through grooves. In other words, the contact insertion portions 17 may have any shape that satisfies the condition where the interference with the contacts is avoided.

Moreover, the substrate retaining portion 15 includes a substrate contact portion 16b, which is the surface on the opposite side of the housing contact portion 16a, which is the surface that comes into contact with the housing 80. The substrate retaining portion 15 includes the substrate contact portion 16b, and the substrate contact portion 16b and the substrate 11 are brought into contact with each other, whereby the gap between the substrate 11 and the substrate contact portion 16b is reduced. Thus, it is possible to reduce the axial displacement of the stator when the lead wiring part 1, the substrate 11, and the lead wiring assembly 40 are attached. When a resin is molded onto the stator assembly 30, because the gap between the substrate 11 and the substrate contact portion 16b is reduced, the generation of voids and the like during molding can be reduced. This enables an improvement in quality.

The substrate retaining portion 15 of the lead wiring part 1 has a space portion (not illustrated) on the side opposite to the housing contact portion 16a, which comes into contact with the housing 80, i.e., the side on which the substrate contact portion 16b is present. The space portion is provided in order to prevent the housing 80 and the substrate 11 from coming into contact with each other. Provision of the space portion for preventing the housing 80 and the substrate 11 from coming into contact with each other can inhibit water from entering the substrate 11 along the leads (the sensor leads 7 and the power leads 8). This enables an improvement in quality.

The housing contact portion 16a and the contact insertion portions 17, which come into contact with the housing 80, can have any shape or any combination of shapes, as illustrated in FIG. 4 to FIG. 7.

The housing 80, the housing contact portion 16a, and the substrate 11 are assembled such that the housing 80 and the housing contact portion 16a are in contact with each other. However, when a resin is molded onto the stator assembly 30, a mold resin may enter the gap between the housing 80 and the housing contact portion 16a because of the molding pressure and a layer may be formed therebetween. Moreover, when the housing 80 and the substrate 11 are welded with solder, a gap is formed in some cases between the housing 80 and the housing contact portion 16a. Thus, the housing 80 and the housing contact portion 16a in finished products are not always in contact with each other due to manufacturing variations, and they are sometimes in a non-contact state. However, even when they are in a non-contact state, because the housing contact portion 16a provided in the lead wiring part 1 is located between the substrate 11 and the housing 80, it is still possible to reduce the amount the contacts, which extend from the housing 80, protrude from the substrate 11, i.e., the amount the contacts protrude from the surface of the substrate 11 on the rotor side, by adjusting the thickness of the housing contact portion 16a. Therefore, there is no impairment of the effect whereby "The distance between the substrate 11 and the rotor can be reduced by reducing the amount the contacts protrude; therefore, the detection accuracy of the rotor position can be improved and the electric motor can be reduced in size. Moreover, the mold thickness can be designed without being dependent on the length of the contacts.".

As illustrated in FIG. 10, the substrate 11 has an approximately rectangular shape obtained by chamfering diagonally opposite corners and includes grooves 35 on one longitudinal side and notches 36 on the other longitudinal side. The grooves 35 are used to lock the lead wiring part 1 and the notches 36 are formed by notching part of the substrate 11 such that the substrate 11 is positioned when it is attached to the lead wiring part 1.

Moreover, the substrate retaining portion 15 of the lead wiring part 1 includes the claws 31 that are locked to the grooves 35 of the substrate 11; and the grooves 32 into which the longitudinal side of the substrate 11 with a part thereof notched is fitted when the substrate 11 is attached. By mating the notches 36 of the substrate 11 and the grooves 32 of the substrate retaining portion 15, the lead wiring part 1 and the substrate 11 can be prevented from moving and deforming due to the molding pressure during molding. This enables an improvement in the quality of the molded electric motor. Moreover, the substrate 11 is attached to the lead wiring part 1 while inserting the longitudinal side of the substrate 11 with a part thereof notched into the grooves 32 of the substrate retaining portion 15 of the lead wiring part 1; therefore, the substrate 11 can be easily attached to the lead wiring part 1. With the above structure, the substrate 11 does not need to be provided with an unnecessarily large positioning portion. Consequently, the area of the substrate 11 can be reduced and thus the number of the substrates 11 that can be molded with a single mold increases. This enables a reduction in the cost of the electric motor.

During manufacturing, the contacts exposed on the attached substrate 11 are bonded with solder. As a result, the sensor leads 7 and the position detection circuit on the substrate 11 are electrically connected. The sensor leads 7 are routed toward the lead-out part 6 on the surface of the lead-out part 6 that is opposite to the surface on which the power leads are laid.

As illustrated in FIG. 2 and FIG. 13, the claws 31 with which the substrate 11 is attached are connected to a doughnut-shaped body 1*a* of the lead wiring part 1 by a plurality of thin connection portions 28. Thus, the molding pressure applied to the substrate 11 during molding can be evenly distributed.

The thin connection portions 28 each include projections 29 formed to project toward the counter-stator side. The projections 29 come into contact with a mold during molding; therefore, the substrate 11 can be axially positioned and thus the axial displacement of the substrate 11 can be prevented (see FIG. 2 and FIG. 13).

Wiring of the power leads 8 will be explained here. The power leads 8 are routed through the lead lead-out portion 2 and along the lead wiring part 1 to the terminals 12 of the stator 10. Specifically, the three-phase power leads constituting the power leads 8 are respectively routed to the terminals 12 of the stator 10 that are arranged at intervals of approximately 120°. The ends of the three-phase power leads are stripped of their covering and are brought into contact with the walls of lead-end retaining portions 14 so as to be positioned. When the lead wiring part 1 is attached to the stator 10, the three-phase power leads are routed along the surface (a lead wiring surface 21) of the lead wiring part 1 on the side where the stator 10 is present and the wall (a wall 22) provided on the inner circumference (see FIG. 3) plurality of projections 22*a* are provided on the wall 22 to prevent displacement of the power leads 8. The power leads 8 are routed while being bent toward the lead-out part 6 by lead fold-back pins 27 provided near the lead-out part 6 and are retained such that they are fitted into a power-lead retaining projection (not illustrated) provided near the lead-out part 6. The lead fold-back pins 27 are projections that function to prevent displacement of the leads.

The two lead fold-hack pins 27 at both ends among the three lead fold-back pins 27 are formed such that they have a greater height than the middle lead fold-back pin 27 by a given amount. Consequently, axial displacement of the power leads can be prevented near the lead lead-out portion. This enables an improvement in quality.

The three power leads 8 are respectively routed to the different lead-end retaining portions 14 via the power lead retaining portion that includes the lead-out part 6 and the power-lead retaining part 4 provided under the lead-out part 6. The power lead 8 to be routed to the lead-end retaining portion 14 (a first lead-end retaining portion) that is farthest from the lead-out part 6 is routed to the middle groove (see FIG. 3) provided on the lead-out part 6 and is further routed to the first lead-end retaining portion. The power leads 8 to be routed to the lead-end retaining portions 14 (second lead-end retaining portions) on both sides of the lead-out part 6 are routed to the outer grooves (see FIG. 3) provided on the lead-out part 6 and are further routed to the second lead-end retaining portions. Any one of the two power leads 8 that are routed to the second lead-end retaining portions is routed around the outside of the power lead 8 that is routed to the first lead-end retaining portion (see FIG. 11). FIG. 11 is a diagram illustrating the lead wiring part 1 (on the stator side) in a state where the power leads 8 are routed.

The core wires of the power leads 8 stripped of their covering are respectively retained by core-wire retaining portions 24 provided at a given distance from the lead-end retaining portions 14 such that the core wires are in proximity to the terminals 12 of the stator 10 to which the lead wiring part 1 is attached (see FIG. 12).

In order to provide spaces for electrodes that sandwich the terminals 12 and the core wires, the lead wiring part 1 is formed with recesses 23 for the electrodes to escape therethrough (see FIG. 12). The spaces for the electrodes that sandwich the terminals 12 and the core wires are necessary for spot welding the core wires and the terminals 12 after the lead wiring part 1 is attached to the stator 10. With the provision of the recesses 23, the power leads 8 are routed closer to the stator 10 from the lead wiring surface 21 (see FIG. 3) of the lead wiring part 1. Displacement prevention projections 25 are provided near the recesses 23 for the electrodes to escape therethrough. The power leads 8 are axially positioned by the displacement prevention projections 25.

As illustrated in FIG. 2, the lead wiring part 1 includes a plurality of approximately trapezoidal pedestals 19 on the surface on the counter-stator side. The end surfaces on the counter-stator side of the pedestals 19 come into contact with a mold during molding; therefore, the stator assembly 30 can be axially positioned. The pedestals 19 have a substantially trapezoidal shape; therefore, it is possible to reduce the area of the pedestals 19 exposed to the outside of the molded stator and to increase the buckling strength of the pedestals 19.

The lead wiring part 1 includes a positioning portion 18 that is used for positioning during molding that is performed after the lead wiring part 1 is attached to the stator 10 (see FIG. 2 and FIG. 3). The positioning portion 18 is located on the inner side of the inner circumference of the stator 10 in the stator assembly 30 obtained by attaching the lead wiring part 1 to the stator 10, and it is provided at a predetermined position corresponding to a pin, a projection, or the like projecting from the center shaft that is used for positioning the mold in the radial direction. The positioning portion 18 has an insertion hole 18*a*. The pin, the projection, or the like projecting from the center shaft that is used for positioning the mold in the radial direction is inserted into the insertion hole 18*a*; therefore, the stator assembly 30 is positioned in the rotational direction. At this point in time, the lead-out part 6 secured to the mold and the leads (the sensor leads 7 and the power leads 8) of the stator assembly 30 are positioned along substantially the same straight line. The lead-out part 6 and the leads of the stator assembly 30 are positioned substantially on the same straight line. Thus, the stator 10 is prevented from being displaced in the rotational direction when it is set in a mold and thus the stator 10 is prevented from being angularly offset from the lead-out part 6. Moreover, the sensor leads 7 are prevented from being stretched and thus a load can be prevented from being applied to the soldered portion of the substrate 11. When the rotational force is applied to the stator 10 due to the resin pressure during molding, the positioning portion 18 also functions to prevent the stator 10 from rotating.

The positioning portion 18 may be provided in the doughnut-shaped body 1*a* of the lead wiring part 1 or may be provided such that it is connected to the body 1*a* as illustrated in FIG. 2 or FIG. 3. When the positioning portion 18 is provided such that it is connected to the body 1*a*, by forming the portion from the body 1*a* of the lead wiring part 1 to the positioning portion 18 into a thin connection shape, the positioning portion 18 can be prevented from being deformed due to the resin pressure during molding and thus the positioning portion 18 can be prevented from being exposed to the mold inner-diameter portion side. This enables an improvement in the quality of the molded stator.

The positioning portion 18 of the lead wiring part 1 includes, on the counter-connection side (stator side), a projection 18*b* (see FIG. 3), which has a given height and comes into contact with the axial end surface of a center shaft that is used for positioning the mold in the radial direction. With the provision of the projection 18*b*, the stator assembly 30 is axially positioned by bringing the projection 18*b* into contact with the axial end surface of the center shaft during molding. Therefore, the positioning portion 18 can be prevented from being deformed due to the resin pressure during molding and thus can be prevented from being exposed to the mold inner-diameter portion side. This enables an improvement in quality.

The positioning portion 18 of the lead wiring part 1 is provided at a position opposed to the substrate retaining portion 15, i.e., at a position with an angular difference of 180°. When the molded electric motor that includes the stator assembly 30 according to the present embodiment is installed such that, for example, its axis is horizontal relative to the outdoor unit of the air conditioner, the molded electric motor is installed such that the lead-out part 6 is located in the lower portion in order to prevent water from entering the molded electric motor. In this case, because the positioning portion 18 is disposed in the upper portion of the outdoor unit, if water enters the molded electric motor, water can be prevented from entering from the surface that is in contact with the center shaft of the mold during molding. This enables an improvement in quality.

As illustrated in FIG. 13, the lead-out part 6 includes projections that extend, by a given length, from the ends in the circumferential direction toward the lead wiring part 1 in the circumferential direction. Provision of the projections increases the projection area of the lead-out part 6 in the radial direction of the stator and thus increases the molding pressure in the radial direction applied to the lead-out part 6 during molding. The molding pressure in the radial direction increases; therefore, the wiring parts are pressed in the radial direction with a greater force than in conventional technologies. As a result, the wiring parts can come into contact with a mold and can be positioned in the radial direction.

The lead-out part 6 includes locking portions for retaining two types of lead retaining parts: two locking portions 26*a* for retaining the power-lead retaining part 4 and two locking portions 26*b* for retaining the sensor-lead retaining part 5. The two locking portions 26*a* are provided near both ends of the lead-out part 6 in the circumferential direction, and they each have an opening that opens toward the center of the lead-out part 6. The power-lead retaining part 4 is inserted from the center side of the lead-out part 6 toward the outer side of the lead-out part 6 so as to be attached. The two locking portions 26*b* are provided near both ends of the lead-out part 6 in the circumferential direction and they each have an opening that opens towards the side opposite to the center of the lead-out part 6. The sensor-lead retaining part 5 is inserted toward the center of the lead-out part 6 so as to be attached.

The power-lead retaining part 4 illustrated in FIG. 14 includes legs 41 to be hooked onto the locking portions 26*a* of the lead-out part 6 and a rib 42. Projections 41*a* are provided at the tips of the legs 41. The power-lead retaining part 4 is axially positioned by bringing the projections 41*a* into contact with the locking portions 26*a*. The legs 41 are locked to the locking portions 26*a* of the lead-out part 6 on which the power leads 8 are laid, whereby the power-lead retaining part 4 is attached to the lead-out part 6. When the power-lead retaining part 4 is locked to the lead-out part 6, the rib 42 comes into contact with the lead-out part 6; therefore, the power leads 8 are secured to the lead-out part 6. The power leads 8 are secured; therefore, the power leads 8 can be prevented from being displaced due to the pressure of a mold resin during molding.

The sensor-lead retaining part 5 illustrated in FIG. 15 includes L-shaped legs 51 that are hooked onto the locking portions 26*b* of the lead-out part 6. The sensor-lead retaining part 5 is locked to the locking portions 26*b* of the lead-out part 6 on which the sensor leads 7 are laid, whereby the sensor-lead retaining part 5 is attached to the lead-out part 6.

In the stator assembly 30 in the present embodiment, the sensor leads 7 and the power leads 8 are respectively routed on different surfaces of the lead wiring part 1. Specifically, the sensor leads 7 are routed on the surface on the counter-stator side of the lead wiring part 1 (the side illustrated in FIG. 2) and the power leads 8 are routed on the surface on the stator side of the lead wiring part 1 (the side illustrated in FIG. 3). This facilitates assembling and enables a reduction in cost. The facilitation of assembling enables an improvement in quality. Furthermore, the power leads 8 are prevented from being axially displaced by retaining the power leads 8 with the projections 22*a* provided on the surface on the stator side. This enables an improvement in quality.

Moreover, the lead wiring part 1 includes two types of locking portions: the locking portions 26*a* and the locking portions 26*b*. The locking portions 26*a* retain the power leads 8, and the locking portions 26*b* retain the sensor leads 7. Thus, the leads can be firmly attached to the lead wiring part 1. This enables an improvement in reliability and, accordingly, in quality. Furthermore, by using the legs 41 of the power-lead retaining part 4 also for retaining the sensor leads 7, assembling can be facilitated and the cost can be reduced. The facilitation of assembling enables an improvement in quality.

With such a configuration, the lead wiring part 1 on which the sensor leads 7 and the power leads 8 are laid is attached to the stator 10 of the electric motor, and the pins 81 of the insulating portion 83 of the stator 10 projecting from the attaching legs 13 of the lead wiring part 1 are secured by thermal welding, ultrasonic welding, or the like, whereby the stator assembly 30 to which the sensor leads 7 and the power leads 8 are attached is obtained (FIG. 1).

A molded stator 60 illustrated in FIG. 16 is obtained by molding a mold resin, such as a thermoplastic resin, an example of which is a BMC (bulk molding compound), onto the stator assembly 30 illustrated in FIG. 1. Furthermore, by embedding a rotor (not illustrated) and a bracket 74 into an opening 62 of the molded stator 60, a molded electric motor 70 illustrated in FIG. 17 and FIG. 18 is obtained.

In FIG. 17 and FIG. 18, a shaft 72, a watertight cap 71, and an E-ring 73 of the rotor are attached to the molded stator 60 by using the bracket 74. The watertight cap 71 prevents water from entering from a gap between the shaft 72 and the bracket 74. Consequently, it is possible to obtain the molded electric motor 70 that allows an increase in productivity and a resulting improvement in quality and that allows a reduction in cost.

Next, the manufacturing process of the molded electric motor 70 will be explained with reference to FIG. 19.

(1) Step 1: The stator core 82 is manufactured. The lead wiring assembly 40 and the lead wiring part 1 are also manufactured.

(2) Step 2: The windings 84 are wound on the stator core 82. The power leads 8 of the lead wiring assembly 40 are also laid on the lead wiring part 1. At this point in time, the core wires of the power leads 8 are routed to the core-wire retaining portions 24. The power-lead retaining part 4 is also manufactured.

(3) Step 3: The power-lead retaining part 4 is attached to the lead wiring part 1. The substrate 11 is also manufactured.

(4) Step 4: The substrate 11 is attached to the lead wiring part 1. The contacts of the housing 80 are soldered to the substrate 11 attached to the substrate retaining portion 15. The sensor-lead retaining part 5 is also manufactured.

(5) Step 5: The sensor-lead retaining part 5 is attached to the lead wiring part 1.

(6) Step 6: The lead wiring part 1 is attached to the stator 10, the pins 81 projecting from the attaching legs 13 of the lead wiring part 1 are thermally welded, and the terminals 12 of the stator 10 and the core wires of the power leads 8 are spot welded.

(7) Step 7: A resin is molded onto the stator assembly 30 so as to manufacture the molded stator 60. Parts, such as the rotor and the bracket 74, are also manufactured.

(8) Step 8: The rotor and the like are attached to the molded stator 60 so as to manufacture the molded electric motor 70.

FIG. 20 illustrates an air conditioner 100 that incorporates the molded electric motor 70 according to the present embodiment of the present invention. The air conditioner 100 includes an indoor unit 200 and an outdoor unit 300 connected to the indoor unit 200. The molded electric motor, which is a driving source for a fan, is provided in each of the indoor unit 200 and the outdoor unit 300. When the molded electric motor 70 is installed in each of the indoor unit 200 and the outdoor unit 300, a plurality of attaching legs 61 (see FIG. 16) extending radially outwardly from the outer circumferential side of the molded stator 60 are used. Such the molded electric motor 70 is used as an electric motor for a fan, which is a main part of the air conditioner 100; therefore, water can be prevented from entering the stator of the electric motor for a fan. Therefore, it is possible to obtain the air conditioner 100 that is low in cost and is of good quality.

As described above, the stator for an electric motor according to the present embodiment includes the substrate 11, on which electronic parts constituting the position detection circuit for the rotor are mounted; the lead wiring part 1, on which the power leads 8 for supplying power to the windings 84 of the stator 10 and the sensor leads 7 connected to the substrate 11 are laid; and the substrate retaining portion 15 that is provided to the lead wiring part 1 and to which the substrate 11 is attached. The substrate retaining portion 15 includes the housing contact portion 16a against which the housing 80 is pressed when the stator assembly 30 is assembled. Consequently, the amount the contacts protrude from the substrate 11 can be reduced. In other words, by reducing the amount the contacts protrude, the distance between the substrate 11 and the rotor can be reduced; therefore, the detection accuracy of the rotor position can be improved and the electric motor can be reduced in size. Moreover, the molding thickness can be designed without being dependent on the length of the contacts.

The stator for an electric motor according to the embodiment of the present invention merely illustrates an example of the content of the preset invention. It is obvious that it can be combined with other well-known techniques and can be modified, such as by omitting a part thereof, without departing from the scope of the invention.

INDUSTRIAL APPLICABILITY

As described above, the present invention is useful as a stator for an electric motor, an electric motor, and an air conditioner.

The invention claimed is:

1. A stator for an electric motor comprising:
a substrate on which a position detection circuit for a rotor is mounted;
a lead wiring part attached to one axial end of the stator and routing a sensor lead to the position detection circuit, wherein the lead wiring part includes:
an annular body part;
a lead-out part for the sensor lead, wherein the lead-out part is provided on an outer peripheral side of the annular body part; and
a plurality of thin connection portions, each of which extends toward an inner peripheral side of the annular body part and opposes the lead-out part; and
a housing connected to an end of the sensor lead, wherein the housing includes a contact for electrically connecting the sensor lead and the position detection circuit, wherein
the substrate is attached to a first surface side of the lead wiring part, and the housing is disposed at a position that is opposed to a position at which the substrate is attached and that is on a second surface side of the lead wiring part, and
the lead wiring part includes a housing contact portion provided between the position at which the substrate is attached and the position at which the housing is disposed, and
the housing contact portion is provided across the plurality of thin connection portions or extends from each of the plurality of thin connection portions.

2. The stator for an electric motor according to claim 1, wherein the housing contact portion includes a contact insertion portion for inserting a contact of the housing.

3. The stator for an electric motor according to claim 1, further comprising a substrate retaining portion provided to attach the substrate to the lead wiring part, wherein
the substrate retaining portion includes a substrate contact portion against which the substrate is pressed when the substrate is attached.

4. The stator for an electric motor according to claim 1, further comprising a substrate retaining portion provided to attach the substrate to the lead wiring part, wherein
the substrate retaining portion includes a space portion on a surface on a side on which the substrate is attached, the space portion preventing the substrate and the housing from coming into contact with each other.

5. The stator for an electric motor according to claim 1, where an outer shell is formed-by a mold resin.

6. An electric motor that uses the stator for an electric motor according to claim 1.

7. An air conditioner on which the electric motor according to claim 6 is mounted as an electric motor for a fan.

* * * * *